May 31, 1932.  H. H. BOYCE  1,860,986
THERMOMETER
Filed July 21, 1927   2 Sheets-Sheet 1
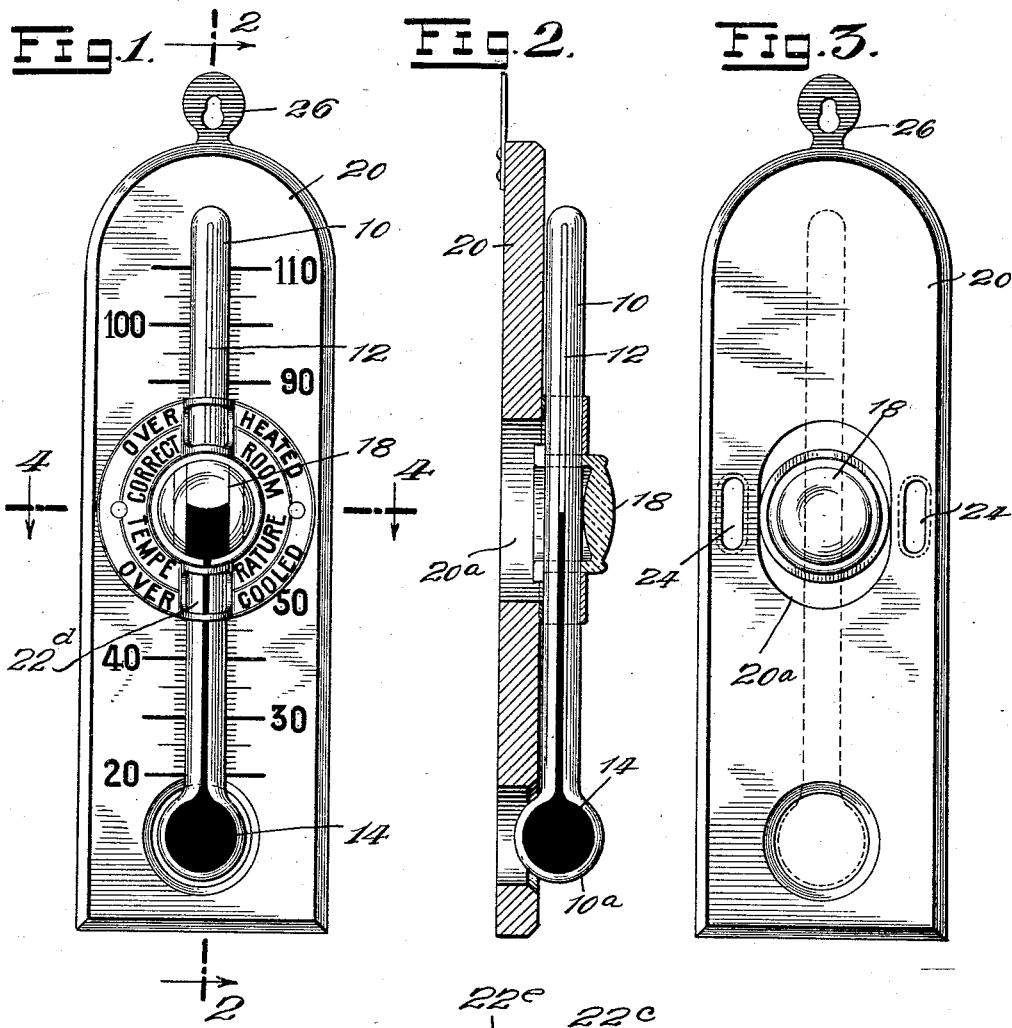
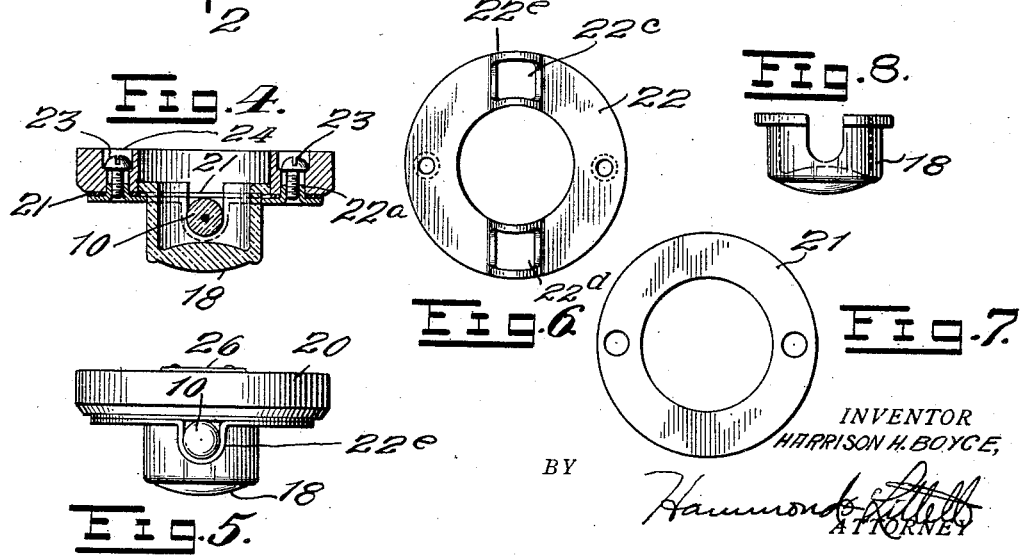
INVENTOR
HARRISON H. BOYCE,
BY
ATTORNEY May 31, 1932.   H. H. BOYCE   1,860,986
THERMOMETER
Filed July 21, 1927   2 Sheets-Sheet 2

INVENTOR
HARRISON H. BOYCE,
BY
Hammond
ATTORNEY

Patented May 31, 1932

1,860,986

UNITED STATES PATENT OFFICE

HARRISON HURLBERT BOYCE, OF JERICHO, NEW YORK

THERMOMETER

Application filed July 21, 1927. Serial No. 207,364.

This invention relates to improvements in thermometers or heat indicators for various purposes, having particular reference to a means for magnifying a portion of the column of heat actuated fluid. It is in particular, an improvement on my copending application, Serial No. 205,062, filed July 12, 1927.

In my copending application, I described a means for magnifying a certain portion of a thermometer stem to enable a more accurate determination of the indicated value by an operator, who was not forced to closely approach the instrument in order to ascertain the height of the fluid therein. In this application I have extended this general idea to other improved forms and modifications as will appear.

It is an object of this invention to provide an article of relatively low cost, and of high effectiveness to be applied to a thermometer or indicating gauge in order to permit an accurate determination of the indicated value thereof, with much more facility from a distant point than heretofore possible, without in any way disturbing the accuracy of the instrument to which it is applied.

It is a further object of this invention to provide a means to be applied to a heat indicator of the class described to enable certain critical ranges of temperature to be readily determined from a distance.

It is still another object of the invention to so construct a thermometer or indicating gauge that certain desired portions of the indicating column will be apparently enlarged or magnified for the purpose of more readily reading the same and the lens of which may be readily adjusted to suit various changes in conditions or in the desires of the operator.

It is a still further object of the invention to produce an improved thermometer for general use that is not of a materially greater cost but is substantially more desirable and effective in particularly indicating the normal temperature range desired.

Further objects and advantages will appear from the following description of the attached drawings which illustrate preferred forms of embodiment to which the invention is adaptable and in which:

Figure 1 is a front elevational view of a thermometer showing the adaptation of my invention thereto.

Figure 2 is a vertical section on the line 2—2 of Figure 1.

Figure 3 is a rear view of the thermometer support with the thermometer shown in dotted lines.

Figure 4 is a horizontal section on the line 4—4 of Figure 1.

Figure 5 is a top plan view of the instrument shown in Figure 1.

Figure 6 is a front view of the outer retaining ring for the lens member.

Figure 7 is a front view of the inner retaining ring, similar to Figure 6.

Figure 8 is a plan view of the lens element.

Figure 9:
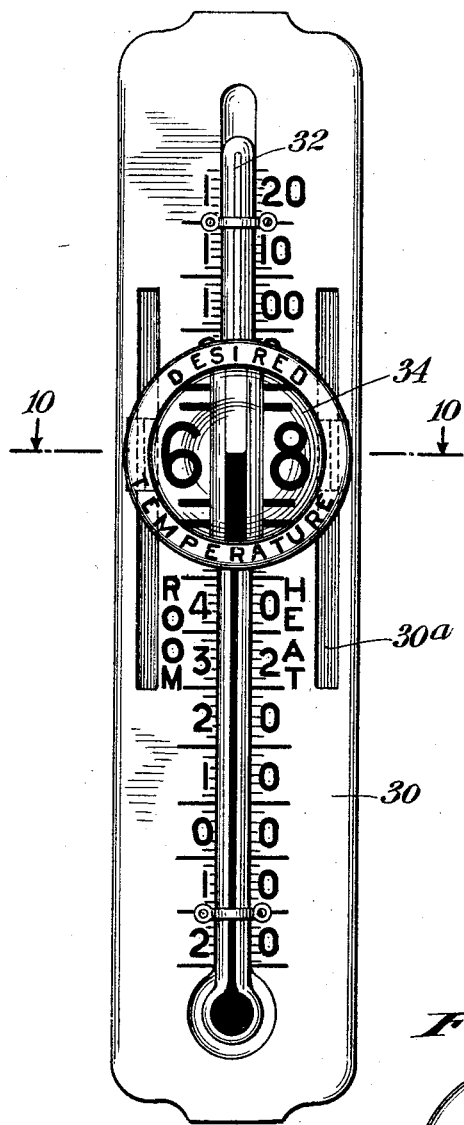
Figure 9 is a front elevational view of a modified form of thermometer.

The thermometer of Figure 1 is illustrative of the kind used for indicating the relative temperatures of a room and for general use to which my invention is applicable. Frequently it is hung in an inconvenient out of the way place in a room or when used to determine outside temperatures or temperatures in a refrigerator, for example, it may require some inconvenience on the part of the one reading it to approach it closely enough for examination as the customary present day thermometer requires. When such inconvenience is necessary the instrument may not be read and the desired temperatures will not be maintained. However, the thermometer shown, while it is generally the same as the usual form of thermometer comprising a stem 10 of transparent material, provided with a uniform bore 12 and filled with a heat responsive fluid 14 of a readily apparent color, is provided with a magnifying element 18 which is the subject of this invention.

As shown in Figures 1 and 2, the thermometer stem 10 is adapted to be retained on a reinforcing base or back 20 which may be of wood or metal, or similar suitable material which has suitable depressions therein to receive the thermometer bulb or well 10a and an intermediate aperture 20a to receive the base of the magnifying lens and allow light to pass to the rear thereof. The back 20 is suitably calibrated in order that the height of the fluid column and the corresponding temperature may be determined as is well known in the art.

If the thermometer is to be used for indicating the usual room temperatures such as, for example, a normal range around 70°, and it is desirable to particularly register when the temperature is within that range, I provide a lens or magnifying element 18 to be placed on or adjacent to the thermometer stem 10 which will magnify that portion of the fluid column at this temperature.

As shown in Figures 4 to 8, the means for assembly comprises inner and outer retaining rings 21 and 22, respectively, the outer one being provided with lugs 22a to suitably position the inner ring 21 and to afford sufficient purchase for the screws 23 which slide in countersunk slots 24 in the back or base portion 20 of the thermometer, and with curved portions 22c which embrace the stem 10. Both of the rings 21 and 22 are suitably perforated to receive the lens 18 which is substantially cylindrical and transversely bored to fit the thermometer stem 10. In Figure 4, the lens itself is shown in cross section as double convex, but any particular or desired form would be just as satisfactory.

The ring 22 may be properly marked as a dial to indicate the location of the normal temperature range for the certain conditions to be indicated and with the lens magnifying the actually uniform bore of the thermometer, the effective or apparent size of the fluid column is greatly exaggerated as shown in Figure 1. It will thus be observable from a considerable distance when the fluid passes into the magnified range as the sudden change from the usual and non-magnified portion to the exaggerated and enlarged section will be very noticeable. To additionally indicate this range, I provide two other apertures 22c and 22d in the offset portions 22e of the ring 22, which will show the fluid column in its normal size, one being above the lens to indicate overheated conditions and the other to show underheat, and in combination with the other indicating insignia, will enable an operator to note the various sections of the normal range from over-cooled to under-cooled range of temperature, the important or desired temperature being most outstanding.

In Figure 3, the thermometer back 20 shows the provision of the vertical slots 24 and the elongated central aperture to permit an adjustment of the magnified indicated range of temperature to comply with desired changes, and permit easy calibration both as to the scale on the base 20 and the temperature to be accentuated. Not every room nor every personal whim requires a normal temperature range of around 70° and therefore, to permit the central location of the magnifying lens over the central part of the normal desired temperature, a simple adjustment by loosening the screws 23 and shifting the lens is provided.

The inner ring 21 is for the purpose of sufficiently spacing the thermometer so that tightening of the screws 23 will not injure the thermometer stem 10 and will hold the lens 18 in the desired position of adjustment and a hook 26 is provided for suspending the instrument from a convenient support.

Figure 10:
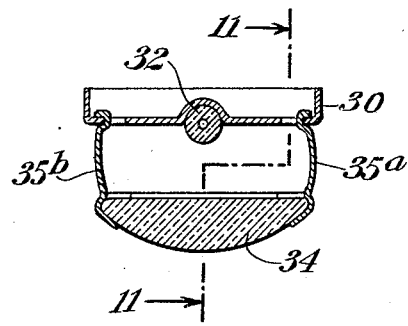
Figure 10 is a vertical section on the line 10—10 of Figure 9.
Figure 11:
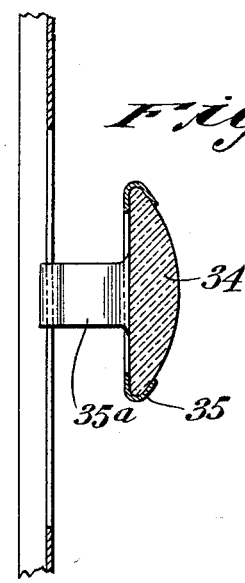
Figure 11 is a part vertical section on the line 11—11 of Figure 10.
Figure 12:
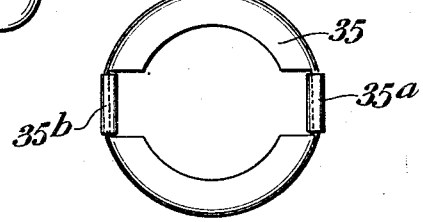
Figure 12 is a rear elevation of the lens retaining ring.

A slightly modified form of the thermometer is illustrated in Figures 9 to 11 inclusive and comprises a supporting base or back 30 preferably made of metal which may be suitably enameled and painted and on which a scale is properly calibrated. It is preferable to place the numerals as near the thermometer stem 32 as possible for a purpose hereinafter to be mentioned. The important points such as the freezing temperature at 32 degrees and the normal room temperature at 68 degrees maybe pointed out by numbering these characters on the scale although any desired temperature may be so illustrated.

To aid in the reading of the temperature from a distance as before mentioned, a magnifying element 34 is adapted to apparently enlarge the size of the uniform bore and by so magnifying the column of indicating and heat responsive fluid, such as is shown in Figure 9, the height of the column is more readily observable from a greater distance.

The lens 34 is adapted to be retained in a holder 35 which is provided with rearwardly extending spring arms 35a and 35b suitably bent and formed to engage with channels or slots 30a in the supporting back 30. These slots are elongated to the extent that the lens element which is retained and slidable therein is adapted to be adjusted over such a range of temperature that would be within the normal use of such thermometer.

The effect of this lens is particularly shown in Figure 9 to illustrate the magnification of the numerals on the calibrated scale. When the desired temperature of the place indicated is 68 degrees, such for example as in a room, the lens 34 will be placed over that particular temperature and the calibrations, being covered, will also become magnified, thereby showing the setting of the lens as well as the height of the column. When the heat responsive fluid reaches the magnifying element, it too will be enlarged and thus from a glance, an operator or a householder standing some distance from the thermometer can instantly tell whether the room heat is proper and according to that desired.

A metal back or support 30 is especially adapted to receive the thermometer stem 32 inasmuch as it may readily be pressed to shape, can be made rigid and yet light in weight and is particularly adapted to serve as a guide for the movement of the magnifying lens 34 as shown in Figure 10. The retaining ring 35 is also preferably made of metal and may be marked or otherwise inscribed by having the appropriate terms "Desired temperature" or the like thereon. The lens, although shown as being convex, is not limited to that shape but any form which will magnify the column of fluid would be satisfactory.

The foregoing detailed description clearly illustrates a very simple and yet highly effective means which is inexpensively adapted to be used in conjunction with the prevailing types of thermometers and which will, by the expedient of magnifying certain critical portions of the thermometer, adequately permit the often necessary, quick, accurate and long distance reading of a possibly inaccessible thermometer or similar instrument, and by means of the convenient method of installation and assembly of the lens and thermometer stem to the supporting and protecting portion, such adjustment as desirable or necessary may be made.

While I have described preferred forms of embodiment which preferably and particularly discloses my invention, certain other modifications may be made and yet will be within the spirit and intent of my invention and I therefore desire protection on the broad interpretation thereof as illustrated herein and claimed in the claims appended hereto.

What I claim as my invention is:

1. In an indicating thermometer of the class described, in combination with a uniform bore and indicating fluid therein, a supporting means calibrated to determine the indicated temperature, means to apparently enlarge certain portions of the fluid column only adjacent the particular predetermined temperature range and means adjustable over limited ranges cooperating with said supporting means adapted to support said enlarging means.

2. In a thermometer of the class described, comprising a supporting back, a thermometer stem having a bore therein containing an indicating fluid, a convex lens to apparently enlarge a certain portion of the fluid column, means to adjustably retain said lens on said stem comprising a pair of vertical slots in said supporting back, and means in said slots to permit vertical adjustment of the lens relative to the thermometer stem.

3. In combination with a thermometer of the class described, comprising a thermometer stem having indicating fluid therein, a calibrated support for said stem, a means to attach the thermometer to the support, including two rings, each of which is perforated to receive a magnifying element, and one of which is additionally apertured above and below the main perforation to indicate in cooperation with said indicating fluid extreme temperature conditions, said rings embracing said stem.

4. In combination with a thermometer of the class described comprising a thermometer stem having indicating fluid therein, a supporting back, a magnifying and enlarging lens adjacent the normal temperature range to apparently enlarge the fluid column, means to attach the magnifying element to the thermometer and to the supporting back including an outer ring indicating in cooperation with the indicating fluid the overheated temperature range by a perforation adjacent another particular range of the thermometer stem, and indicating the underheated temperature range by another perforation adjacent another particular range of the stem and an intermediate perforation to receive the above-mentioned lens.

5. In an indicating thermometer including a stem, having a substantially uniform bore, a base supporting said stem, means adjacent a portion only of the stem to apparently enlarge said portion of the stem and the bore therein and a perforated dial adjustably secured to said base, to support the enlarging means, said means projecting through said perforation.

6. In a household thermometer, a flat base having slots therein, a temperature responsive device having an indicating stem, means to attach and adjustably secure the indicating stem to said base including two rings formed to receive and clamp said stem therebetween and securing members extending into adjustable relation in said slots and securing said rings to said base, said rings having aligned apertures coinciding with a portion of the stem to permit reading of the temperature indication.

7. In a thermometer having an indicating stem, an indicating target including two rings formed to receive said stem therebetween and provided with aligned apertures coinciding with a portion of said stem, and means to secure said rings together in clamping relation to said stem.

8. In a thermometer having an indicating stem, a magnifying means adjacent a portion of said stem, means for securing said magnifying means adjacent said stem including two rings formed to receive said stem and magnifying means and provided with aligned apertures aligned with a portion of the stem accentuated by said magnifying means and means for securing said rings together in clamping relation to said stem.

9. In a thermometer of the class described, an indicating stem having a bore therein, a colored fluid in the bore, means to apparently enlarge the normal room temperature range thereof, in relation to other portions of the bore, and means including a multiply apertured dial to adjustably position the magnifying element and secure said stem to said base, said means additionally accentuating temperature ranges adjacent the normal range.

In testimony whereof I have affixed my signature to this specification.

HARRISON H. BOYCE.